Sept. 10, 1968   R. L. ZIMMERMAN ET AL   3,401,153
POLYMERIZATION PROCESS FOR PREPARING HOMOGENEOUS
VINYLIDENE AROMATIC-MALEIC COMPOUND COPOLYMERS
Filed Aug. 7, 1964
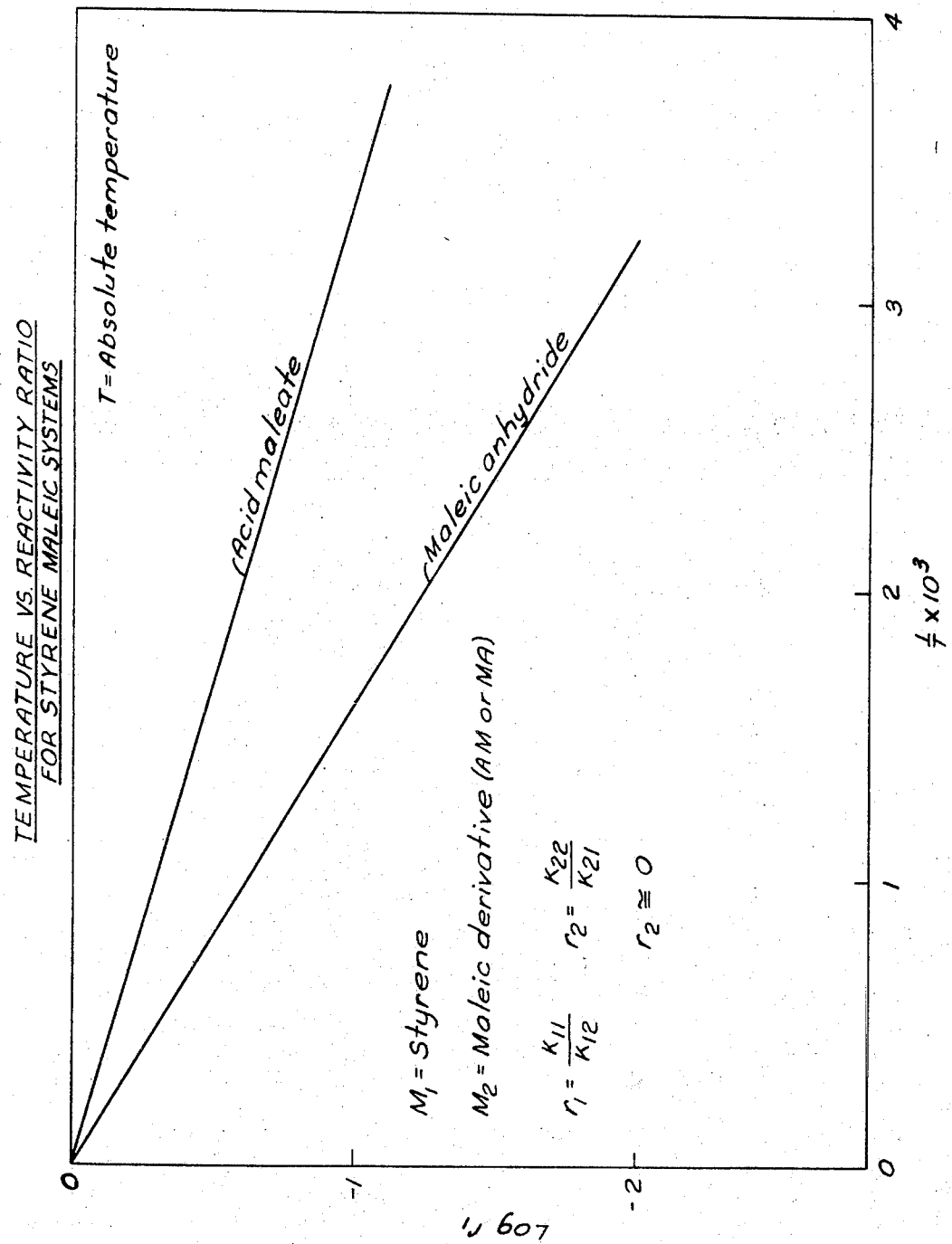
INVENTORS.
Robert L. Zimmerman
Dale M. Pickelman
BY
AGENT

United States Patent Office 3,401,153
Patented Sept. 10, 1968

3,401,153
POLYMERIZATION PROCESS FOR PREPARING HOMOGENEOUS VINYLIDENE AROMATIC-MALEIC COMPOUND COPOLYMERS
Robert L. Zimmerman, Midland, and Dale M. Pickelman, Auburn, Mich., assignors to The Dow Chemical Company, Midland, Mich., a corporation of Delaware
Filed Aug. 7, 1964, Ser. No. 388,101
5 Claims. (Cl. 260—78.5)

ABSTRACT OF THE DISCLOSURE

This invention relates to a three step batch procedure for preparing homogeneous vinylidene aromatic-maleic anhydride copolymers containing more than 80% vinylidene aromatic compound.

---

This invention relates to a polymerization process, and is more particularly concerned with a three-step procedure for batch preparation of a vinylidene aromatic-maleic anhydride copolymer having a monomeric ratio greater than 4:1, a solution viscosity less than 0.9 cps. and wherein at least 95 percent of the copolymer is within 5 percent maleic anhydride (MA) composition by fractionation analysis.

The steps of the method of this invention comprise: (1) heating a high boiling polymerization solvent to reflux and charging about 5–15 percent of the total monomeric feed into the refluxing solvent, (2) linearly feeding the desired ratio of vinylidene-maleic monomer mixture, with catalyst, so as to maintain a constant amount of vinylidene monomer in the reactor and (3) finishing the last 5–15 percent conversion by feeding the remaining maleic monomer to match the disappearance of vinylidene monomer.

Maleic monomer includes maleic anhydride and $C_1$ to $C_4$ alkyl acid maleates preferably methyl acid maleate. When acid maleates are employed as starting materials the polymeric product is deesterified during and after polymerization by the distillation of the low boiling alcohol component, to produce the anhydride polymer.

Suitable vinylidene monomers include, for example, styrene, vinyltoluene, t-butyl styrene, vinyl xyene, ar-chorostyrene, mixtures thereof, or mixtures of any of the foregoing with $\alpha$-methyl styrene.

Any inert solvent boiling between about 140° C. and 250° C., preferably being a solvent for the polymer, may be employed, such as, for example, aromatic hydrocarbons, chlorinated hydrocarbons, ketones, ethers or esters. Specific solvents which may be employed include mixed alkyl benzenes, cumene, acetophenone, and ethylene glycol monoethyl ether acetate solvents. The ratio of monomers to solvent is desirably in the range of 1:9 to 3:1 by weight, and is preferably in the range of 2:3 to 3:2. While temperatures of from about 140–250° C. may be employed, the polymerization temperature is preferably from about 160–200° C. and is most advantageously relatively uniform throughout the reaction time.

The inert solvent is heated to reflux in an inert atmosphere, preferably with a steam condenser followed by a water condenser and a trap to remove low boiling components, e.g., low boiling alcohols if acid maleate monomers are employed, and maintain a uniform reaction temperature. Three charges of monomers are then fed as follows:

(1) An initial charge of monomer is introduced. The composition of this charge is calculated from $r_1 x = n - 1$ where $n$ is the mole ratio of vinylidene to maleic monomer in the desired polymer, $x$ is the mole ratio of vinylidene to maleic in the monomer mixture and $r_1$ is the reactivity ratio from FIGURE 1 for the reaction temperature and maleic derivative. The amount of the initial charge is about 5–15 percent of the total monomers to be reacted. If $P$ is the total charge for steps 1 and 3 and $M$ is the total weight of monomer, the initial charge equals $$PM - \left[\frac{1}{1+n} - \frac{1}{x+1}\right] PM$$

A free radical initiating catalyst, preferably a peroxide catalyst may be added with this initial charge in the amount of 0.1 to 5.0 percent.

(2) Within 5 minutes after introduction of the initial charge and preferably immediately thereafter, especially if catalyst is used, a continuous linear feed of monomer [the amount is $(1-P)$ times total monomer] and catalyst (0.1–5 percent), with additional solvent, if desired, is started. The monomer composition of this second feed is such that the ratio of vinylidene to maleic compound is essentially $n$ or the composition of the desired product. (If the solvent employed is an active chain transfer agent the monomer composition may have to be adjusted upward in maleic content slightly to allow for this.) The feed rate employed is chosen according to the temperature of reaction, catalyst type and concentration, monomer composition, and amount of the initial charge (5–15 percent), i.e., according to the polymerization rate which obtains. The feed rate should be essentially identical to the polymerization rate so as to maintain a steady state condition. This may be ascertained in simple manner by analyzing the reactor contents at intervals for the amount of vinylidene monomer present, e.g., by titration of an aliquot. The total amount of vinylidene monomer in the reactor must remain essentially constant throughout the feed time. At the end of the continuous feed the conversion of monomer to polymer will be 85–95 percent. If the second charge is greater than $(1-P)$ times the total monomer the conversion at the end of step 2 will be too low which results in lack of homogeneity in the final polymer.

(3) To finish off the polymerization, the remainder of the maleic monomer equal to $$\left[\frac{1}{1+n} - \frac{1}{x+1}\right] PM$$

preferably along with additional catalyst (0.1–5 percent), is fed at a rate about equivalent to the disappearance of the vinylidene monomer. The reaction is terminated at greater than 95 percent conversion.

The unique control of the process made possible with this invention makes reproducibility and batch to batch resin quality suitable for production of uniform coating vehicles. This process is thus suitable for conventional kettles available in the industry where it is desired to produce a very low molecular weight copolymer of homogeneous composition.

The invention is further illustrated by the following examples.

EXAMPLE 1

A five liter flask was fitted with a steam condenser followed by a cold water condenser having a trap. This reactor was charged with 1500 g. of SC 150 mixed alkyl benzenes having a boiling point of about 200° C. and heated to reflux in a nitrogen atmosphere. Three feed solutions were prepared on the basis of making 1500 g. of a copolymer containing 15.8 mole percent or 15.0 weight percent maleic anhydride at 190° C. (463° K.):

(1) 190 g. S+1.9 g. MA.
(2) 1075 g. S+190 g. MA+12.65 g. di-t-butyl peroxide.
(3) 33.1 g. MA+2.35 g. DTBP.

Feed No. 1 was introduced into the reactor in 2 minutes with good agitation in the reactor. Feed No. 2 was started at 3 minutes and fed continuously over 45 minutes. During this time the reactor temperature dropped from 200° C. to 188° and rose again to 191° C. A total of 9 cc. of liquid was collected in the trap overhead. The third feed was added in increments at 5 minute intervals over the next 25 minutes by melting the MA at 60° C., and adding 5 ml. along with 0.6 ml. DTBP at each interval. The temperature rose to 197° C. and heating was continued an additional 35 minutes before shut down.

During the reaction, at 10 minute intervals from the start of feed No. 2 an aliquot of the reaction mixture was removed and the polymer recovered from a portion by devolatilization at 213° C. for 1½ hours. The aliquot was also titrated by bromine titration to measure the percent styrene monomer present.

The final copolymer was examined by infrared analysis and found to have less than 5 percent esterification of the maleic groups. Viscosity 0.679 cps. The copolymer was fractionated as in Example 1.

| Fraction | Skellysolve, cc. | Wt., g. | Pct. MA | Viscosity |
|---|---|---|---|---|
| 1 | 150 | 12.10 | 15.9 | 0.806 |
| 2 | 175 | 9.83 | 15.1 | 0.764 |
| 3 | 225 | 6.92 | 14.7 | 0.735 |
| 4 | 325 | 5.75 | 14.0 | 0.696 |
| 5 | 525 | 4.47 | 13.3 | 0.653 |
| 6 | 1,025 | 1.66 | 13.0 | 0.621 |
| 7 | Residue | 6.95 | 11.5 | 0.531 |

With reference to Example 1, the following calculation illustrates the method of determining the amount of the monomers to be fed in each of the three steps of the present process.

| Time, min. | Cut | Wt. mon. fed, g. | Wt. distilled | Wt. cut | Pct. solids | Pct. MA in pol. | Wt. soln. in reactor | Wt. pct. S | Total S in reactor |
|---|---|---|---|---|---|---|---|---|---|
| 3 | | 192 | | | | | 1,692 | | 190 |
| 13 | 1 | 278 | 0.9 | 20 | 15.7 | 14.0 | 1,669 | 10.52 | 207 |
| 23 | 2 | 300 | 2.7 | 25 | 28.5 | 13.5 | 2,246 | 8.65 | 194 |
| 33 | 3 | 286 | 1.8 | 26 | 37.8 | 13.3 | 2,506 | 7.14 | 179 |
| 43 | 4 | 290 | 2.7 | 23 | 45.6 | 13.3 | 2,767 | 6.41 | 177 |
| 48 | 5 | 124 | | 20 | 48.6 | 13.3 | 2,868 | 5.72 | 164 |
| 53 | 6 | 7 | | 20 | 50.2 | 13.3 | 2,875 | 3.78 | 109 |
| 58 | 7 | 7 | | 20 | 51.4 | 13.5 | 2,862 | 2.84 | 81 |
| 63 | 8 | 7 | | 20 | 52.8 | 13.5 | 2,849 | 2.13 | 61 |
| 68 | 9 | 7 | | 20 | 53.6 | 13.8 | 2,836 | 1.57 | 45 |
| 73 | 10 | 7 | | 21 | 54.4 | 13.9 | 2,823 | 1.17 | 33 |
| 163 | 11 | | | 20 | 54.5 | 13.9 | 2,802 | 1.01 | 28 |

The solution viscosity (10 weight percent in MEK at 25° C.) of the final copolymer product was 0.702 cps. The copolymer 50 g. was dissolved in 250 g. toluene and fractionally precipitated with Skellysolve to 96–99° C. The precipitated fraction was redissolved by heating and reprecipitated on cooling over several hours with stirring to achieve good fractionation.

| Fraction | Skellysolve, cc. | Wt., g. | Percent MA | Viscosity |
|---|---|---|---|---|
| 1 | 150 | 0.64 | 16.1 | |
| 2 | 175 | 2.29 | 17.1 | 0.841 |
| 3 | 225 | 15.81 | 15.9 | 0.814 |
| 4 | 325 | 10.20 | 14.8 | 0.745 |
| 5 | 525 | 6.80 | 13.8 | 0.699 |
| 6 | 1,025 | 3.92 | 13.1 | 0.647 |
| 7 | Residue | 8.33 | 11.6 | 0.537 |

In a manner similar to Example 1, a copolymer of styrene and maleic anhydride was prepared by copolymerizing styrene and methyl acid maleate and simultaneously removing methanol from the half ester to regenerate the anhydride. Feeds were prepared as follows:

(1) 200 g. S+15 g. methyl acid maleate calculated from FIGURE 1 for maleic half ester.

(2) 1075 g. S+253 g. MeAM+13.3 g. DTBP.

(3) 32 g. MeAM+2.47 g. DTBP+25 g. SC 150.

Feed No. 1 was added to 1500 g. of refluxing SC 150 at 201° C. and immediately continuous feed of No. 2 was started to run for 43 minutes. The reactor temperature went down to 185° C. Feed No. 3 was then added in 5.5 ml. increments every minute. Samples were removed at 10 minute intervals over the reaction time and analyzed.

| Time, min. | Cut | Wt. mon. fed. | Pct. solids | Pct. MA in pol. | Wt. Pct. S in aliquot | Unpolym. S in reactor, g. |
|---|---|---|---|---|---|---|
| 0 | | 215 | 0 | | | 200 |
| 10 | 1 | 313 | 14.2 | 15.8 | 12.74 | 257 |
| 20 | 2 | 314 | 25.6 | 14.4 | 10.58 | 242 |
| 30 | 3 | 313 | 37.2 | 14.0 | 9.25 | 236 |
| 40 | 4 | 313 | 44.3 | 14.0 | 8.36 | 235 |
| 43 | 5 | 88 | 46.5 | 13.7 | 7.97 | 228 |
| 54 | 6 | 59.5 | 52.3 | 13.7 | 3.10 | 88 |
| 65 | 7 | | 53.3 | 13.6 | 2.41 | 70 |
| 75 | 8 | | 53.3 | 13.5 | 2.50 | 66 |
| 85 | 9 | | 53.7 | 13.5 | 2.28 | 62 |

*Charge 1*

$$T = 463° K. \frac{1}{T} = 2.16 \times 10^{-3}$$

From FIGURE 1 log $r_1 = -1.33$ or $r_1 = 0.046$. Since $$n = \frac{84.2}{15.8} = 5.33$$

from $r_1 x = n - 1$, $x = 93$. The figure P was arbitrarily chosen to be 0.15. Then, charge $$1 = 0.15 \times 1500 - \left[\frac{1}{6.33} - \frac{1}{94}\right] \times 0.15 \times 1500 =$$

$$225 - 33.1 = 191.9 \text{ of } S + MA$$

Since $x = 93$, $MA = 1.9$ g. and $S = 190$ g.

*Charge 2*

Charge $2 = 0.85 \times 1500 = 1275$ g. S+MA. Since the polymer is to contain 15 percent MA, MA=190 g. S=1085 g. (NB A mistake was made in the sample and only 1075 g. was fed.)

*Charge 3*

$$\text{Charge } 3 = \left[\frac{1}{6.33} - \frac{1}{94}\right] 0.15 \times 1500 = 33.1 \text{ g. } MA$$

The fed time of the linear addition is generally from about 30 minutes to 5 hours. The process is preferably carried out at atmospheric pressures, though higher or lower pressures may be employed if desired and if the temperature ranges are observed.

We claim:

1. Process for the batch polymerization of a vinylidene aromatic-maleic copolymer having a monomeric ratio of greater than 4:1, a solution viscosity of less than 0.9 cps. and having greater than 95 percent of the copolymer within a range of 5 percent maleic content by fractionation analysis which comprises (1) heating a high boiling polymerization solvent to reflux and charging about 5 to 15 percent of the total monomeric feed of vinylidene/maleic calculated from $r_1x=N-1$. (2) feeding a charge of the monomers of the desired ratio with catalyst at linear rate so as to maintain a constant amount of vinylidene monomer in the reactor and (3) finishing the last 5 to 15 percent conversion by feeding the remaining maleic monomer to match the disappearance of vinylidene monomer.

2. Process of claim 1 wherein the vinylidene monomer is styrene.

3. Process of claim 2 wherein the maleic compound is maleic anhydride.

4. Process of claim 2 wherein the maleic compound is a $C_1$ to $C_4$ alkyl acid maleate.

5. Process of claim 2 wherein the maleic compound is methyl acid maleate.

References Cited

UNITED STATES PATENTS

| | | | |
|---|---|---|---|
| 2,397,260 | 3/1946 | Hanford et al. | 260—87.7 |
| 2,414,311 | 1/1947 | Larson | 260—94 |
| 2,179,040 | 11/1939 | Heuer | 260—78.5 |

OTHER REFERENCES

Billmeyer, Textbook of Polymer Chemistry, 1957, p. 239, 1st and 2nd para.

JOSEPH L. SCHOFER, *Primary Examiner.*

J. KIGHT, *Assistant Examiner.*